W. Weusthoff,

Seed Wheel.

No. 96,063.   Patented Oct. 19, 1869.

Witnesses.   Inventor.

UNITED STATES PATENT OFFICE.

WILLIAM WEUSTHOFF, OF DAYTON, OHIO.

IMPROVEMENT IN SEED-WHEELS FOR GRAIN-DRILLS.

Specification forming part of Letters Patent No. 96,063, dated October 19, 1869.

*To all whom it may concern:*

Be it known that I, WILLIAM WEUSTHOFF, of Dayton, in the county of Montgomery, and in the State of Ohio, have invented certain new and useful Improvements in Seed-Wheels for Grain-Drills; and I do hereby declare that the following is a full, clear, and exact description thereof, reference being had to the accompanying drawings, making a part of this specification, in which—

Figure 1:
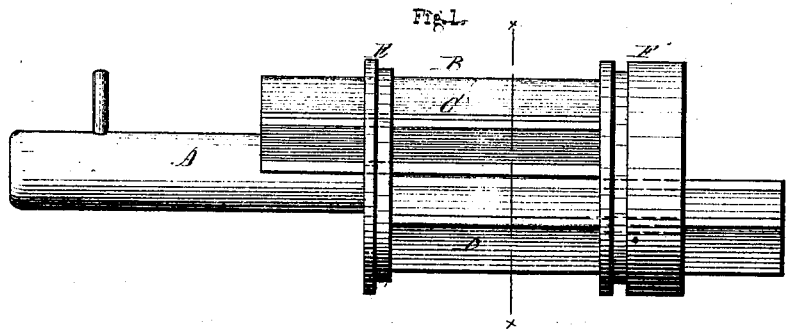
Figure 2:
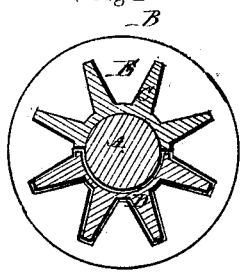
Figure 3:
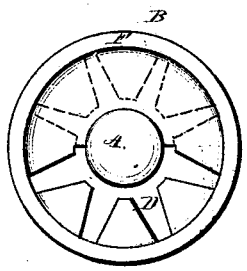

Figure 1 is a side elevation of my improved device. Fig. 2 is a cross-section on the line *x x* of Fig. 1, and Fig. 3 is an end view of the same.

Letters of like name and kind refer to like parts in each of the figures.

My invention is an improvement upon a seed-wheel for which Letters Patent No. 92,680 were granted to myself and C. Schmidt, July 13, 1869; and it consists in the peculiar form of the sections of the wheel, by means of which greater ease of construction is secured, as is hereinafter specified.

In the annexed drawings, A represents the seed-wheel shaft, having secured thereon the seed-wheels B. Each seed-wheel is composed of two sections, C and D, which, when combined, present the appearance shown in Fig. 1, the body being provided with a series of V-shaped grooves extending longitudinally along its periphery between two disks, E and F, which are somewhat larger than the circumference of said body. As before stated, the wheels consist of two sections, which are formed by dividing the grooved portion of the same longitudinally into equal parts, C and D, and attaching one of said parts to each disk. An opening is provided through each disk, upon the opposite side, radially from the grooved part secured thereto, which corresponds in size and shape transversely with said part, and permits that secured to the opposite disk to pass through, by which means one section may be shut into the other, and the distance between the disks varied at pleasure. This construction of the sections produces a seed-wheel having the same outward appearance as that before mentioned as patented; but as said sections are more easily molded and cast, an important reduction in the cost is effected and a more perfect wheel obtained.

Having thus fully set forth the nature and merits of my invention, what I claim as new, and desire to secure by Letters Patent, is—

The within-described expansible seed-wheel, consisting of the sections C and D, secured to the disks E and F, substantially as and for the purpose specified.

In testimony that I claim the foregoing I have hereunto set my hand this 27th day of August, 1869.

WILLIAM WEUSTHOFF.

Witnesses:
 JAMES C. YOUNG,
 THOS. D. MITCHELL.